(12) United States Patent
Bender

(10) Patent No.: US 10,221,293 B2
(45) Date of Patent: *Mar. 5, 2019

(54) CARBON BLACK PELLETS BOUND BY STYRENE-BUTADIENE LATEX POLYMER

(71) Applicant: Bridgestone Bandag, LLC, Muscatine, IA (US)

(72) Inventor: David L. Bender, Muscatine, IA (US)

(73) Assignee: Bridgestone Bandag, LLC, Muscatine, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/513,274

(22) PCT Filed: Sep. 22, 2015

(86) PCT No.: PCT/US2015/051404
§ 371 (c)(1),
(2) Date: Mar. 22, 2017

(87) PCT Pub. No.: WO2016/048997
PCT Pub. Date: Mar. 31, 2016

(65) Prior Publication Data
US 2017/0306125 A1    Oct. 26, 2017

Related U.S. Application Data

(60) Provisional application No. 62/054,172, filed on Sep. 23, 2014.

(51) Int. Cl.
*C08K 3/04* (2006.01)
*C08F 236/10* (2006.01)

(52) U.S. Cl.
CPC ............. *C08K 3/04* (2013.01); *C08F 236/10* (2013.01); *C08K 2201/005* (2013.01)

(58) Field of Classification Search
CPC ................ C08K 3/04; C08F 236/10
See application file for complete search history.

(56) References Cited

U.S. PATENT DOCUMENTS

| | | |
|---|---|---|
| 2,457,962 A | 1/1949 | Whaley |
| 2,850,403 A | 9/1958 | Day |
| 3,004,940 A | 10/1961 | King |
| 3,844,809 A | 10/1974 | Murray |
| 3,953,543 A * | 4/1976 | Futamura ............. C08F 297/04 525/271 |
| 4,440,807 A | 4/1984 | Gunnell |
| 5,168,012 A | 12/1992 | Watson et al. |
| 5,177,153 A * | 1/1993 | Liebermann ............. C08F 2/18 525/313 |
| 6,479,571 B1 | 11/2002 | Cooke et al. |
| 6,803,026 B1 | 10/2004 | Linde et al. |
| 7,651,772 B2 | 1/2010 | Lee |
| 8,586,651 B2 | 11/2013 | Wang et al. |
| 2002/0111413 A1* | 8/2002 | Lopez-Serrano Ramos ............ C08K 3/04 524/495 |
| 2006/0047055 A1 | 3/2006 | Agostini |
| 2006/0205867 A1 | 9/2006 | Yanagisawa et al. |
| 2006/0263602 A1* | 11/2006 | Choi .................... C08F 236/10 428/407 |
| 2010/0143585 A1 | 6/2010 | Lee |
| 2011/0054069 A1* | 3/2011 | Chen ...................... C08J 3/005 523/150 |
| 2011/0166265 A1 | 7/2011 | Harris |
| 2012/0053264 A1 | 3/2012 | Nakayama et al. |
| 2017/0283576 A1* | 10/2017 | Bender ................... C08K 3/04 |

FOREIGN PATENT DOCUMENTS

| | | |
|---|---|---|
| EP | 1065220 A1 | 1/2001 |
| WO | WO2016048972 A1 | 3/2016 |

OTHER PUBLICATIONS

International Search Report and Written Opinion for PCT/US2015/051404; dated Nov. 19, 2015; pp. 1-13; Korean Intellectual Property Office; Daejeon; Republic of Korea.
International Search Report for International Appl. No. PCT/US2015/051404 dated Nov. 19, 2015.
Supplementary European Search Report for EP15844372, dated Mar. 27, 2018.
European Search Opinion for EP15844372, dated Mar. 27, 2018.
Goodyear Chemical: "Product Data Sheet—Pliogum 1027 Elastomer", issued on Dec. 19, 2013, XP055463128, Retrieved from the Internet: URL:http://www.goodyearchemical.com/pdf/PDS/Pligum_1027_PDS.pdf [retrieved on Mar. 27, 2018].

* cited by examiner

Primary Examiner — Hannah J Pak

(57) ABSTRACT

A carbon black pellet comprising a plurality of agglomerates, aggregates, or primary carbon black particles and a binder including a hot-polymerized styrene-butadiene copolymer.

14 Claims, 1 Drawing Sheet

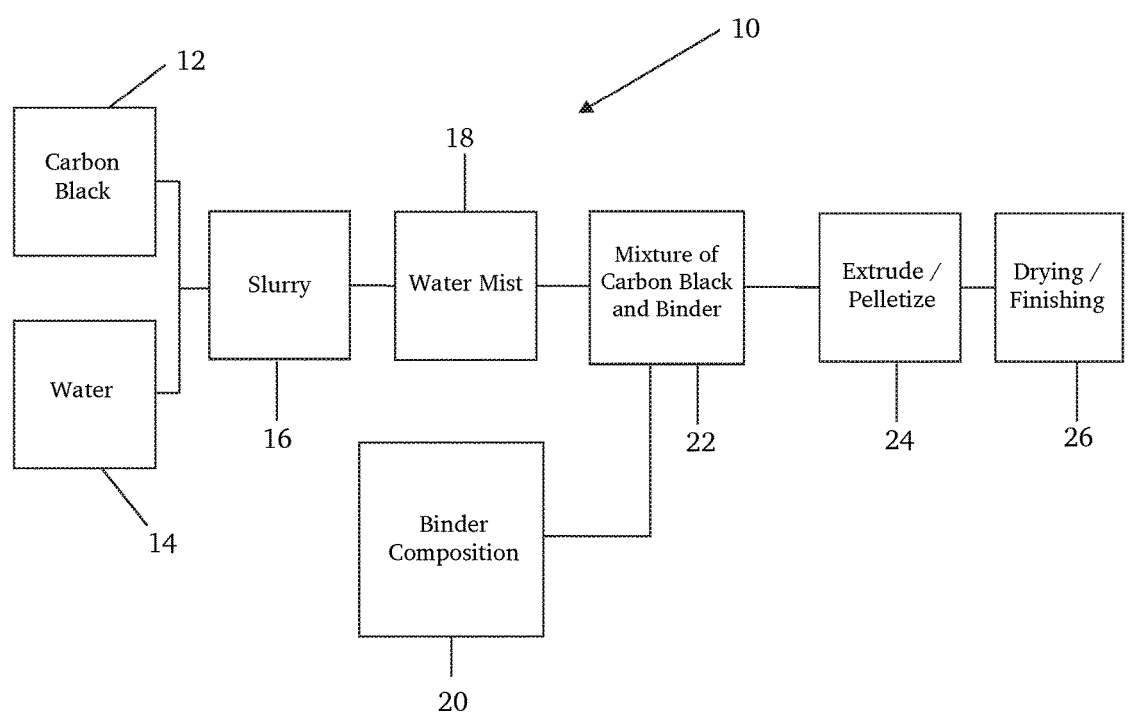

CARBON BLACK PELLETS BOUND BY STYRENE-BUTADIENE LATEX POLYMER

This application is a National-Stage application of PCT/US2015/051404 filed on Sep. 22, 2015, which claims the benefit of U.S. Provisional Application Ser. No. 62/054,172 filed on Sep. 23, 2014, which are incorporated herein by reference.

FIELD OF THE INVENTION

Embodiments of the present invention are directed toward carbon black pellets bound by styrene-butadiene copolymer and methods for producing the same by using hot-polymerized styrene-butadiene latexes.

BACKGROUND OF THE INVENTION

The incorporation of fillers in the manufacture of rubber and plastic products is well-known in the industry. For example, the incorporation of carbon black in tire treads is widely used for improving wear characteristics. Elsewhere, colorants are incorporated into polyvinyl chloride and clays are incorporated into polymer composites.

In some instances, it is desirable to treat these fillers with agents, or binders, to impart further benefits. For example, these binders can reduce the generation of airborne filler dust and can also provide easier conveyance of the filler material. This treatment can also impart different surface characteristic to the binder to allow ease of dispersion into other media or to enhance or reduce interactions between components.

U.S. Pat. No. 2,850,403 discloses the use of carbohydrates (e.g. sugar, molasses, soluble starches, saccharides and lignin derivatives) as pellet binders. Likewise, U.S. Pat. No. 3,844,809 discloses the reduction in pellet dust levels partially through the use of molasses as a co-binder. These binders can form beads or pellets with the filler (such as carbon black).

Another conventional method for reducing the generation of airborne filler dust is mixing the carbon black with a latex. One example of this is U.S. Pat. No. 2,457,962, which discloses methods of beading carbon black with a latex as a wetting agent to improve the handling properties of the carbon black and dispersion of the carbon black in rubber. In one method disclosed therein, carbon black beads are formed by wetting the carbon black with latex and then agitating the mixture in a conventional carbon black pelletizer. The '962 patent discloses that the rubber content of the latex beaded carbon black should range from 5% to 20% by weight of the beaded carbon black.

In another example where a latex was utilized, U.S. Pat. No. 5,168,012 discloses carbon black beads made by a process generally including the steps of adding a latex comprising an elastomer to a carbon black filler and beading the carbon black powder and the latex in a carbon black beading apparatus. There, the latex is added to the carbon black in an amount sufficient to form beaded carbon black and the latex comprises the elastomer in an amount between 0.5% and 5% by weight of the beaded carbon black. The individual aggregates of carbon black particles become associated with latex and the elastomer is distributed substantially throughout the resulting beaded carbon black. The latex-treated carbon black beads are then preferably dried at a temperature sufficiently low to prevent decomposition or gelling of the elastomer.

Another example of using a latex is U.S. Pat. No. 8,586,651, where a method of producing an elastomer composite is disclosed. The method therein generally discloses the steps of combining a first fluid comprising elastomer latex with a second fluid comprising particulate filler; causing the elastomer latex to coagulate, thereby forming masterbatch crumb; bringing the masterbatch crumb to a desired water content, thereby forming a dewatered coagulum; removing water from the dewatered coagulum by subjecting the dewatered coagulum to mechanical energy, thereby causing the dewatered coagulum to heat as a result of friction, while allowing the dewatered coagulum to achieve a desired temperature and water content percentage, thereby producing a masticated masterbatch; and subjecting the masticated masterbatch to additional mechanical energy while further reducing the water content.

SUMMARY OF THE INVENTION

Embodiments of the present invention provide a carbon black pellet comprising a plurality of agglomerates, aggregates, or primary carbon black particles and a binder including a hot-polymerized styrene-butadiene copolymer.

Still other embodiments of the present invention provide a process for making a carbon black pellet, the process comprising introducing carbon black to a latex containing a styrene-butadiene copolymer to form a mixture and densifying the mixture to form a pellet.

BRIEF DESCRIPTION OF THE DRAWINGS

The FIGURE is a schematic that provides a general overview of a process for making a pellet according to one or more embodiments of the present invention.

DETAILED DESCRIPTION OF ILLUSTRATIVE EMBODIMENTS

Embodiments of the present invention are based, at least in part, on the discovery of carbon black pellets bound with hot-polymerized styrene-butadiene polymer. These pellets can advantageously be prepared by using styrene-butadiene latexes. While the prior art contemplates the use of styrene-butadiene rubber to bind carbon black particles, the styrene-butadiene rubber contemplated by the prior includes cold-polymerized styrene-butadiene rubber of the type used in the manufacture of tires. In contrast, the styrene-butadiene latex employed in the present invention is hot polymerized and therefore offers different characteristics when used to bind carbon black. Indeed, it is not only contemplated that these pellets will exhibit the advantages associated with the prior art pellets, such as improved dust control and more efficient dispersion into a rubber compound, but it is also contemplated that these pellets will provide rubber composites with improved interaction between the carbon black and the polymer network. As a result, embodiments of the invention are also directed toward tire components, such as treads and sidewalls, prepared by using the carbon black pellets of this invention.

Pellet Characteristics

In one or more embodiments, the carbon black pellets of this invention generally include a plurality of carbon black aggregates and/or agglomerates, as well as primary carbon black particles, bound to each other by a polymeric binder. As the skilled person understands, carbon black agglomerates include primary carbon black particles and/or aggregates held together by various forces of attraction. Aggregates include primary carbon black particles held together by chemical bonds, and they often represent the smallest dispersible carbon unit. Particles, which may be referred to as primary carbon black particles, are the smallest carbon unit and may be referred to as carbon black spheres. According to aspects of this invention, the polymeric binder includes a hot-polymerized styrene-butadiene copolymer, which will be described in greater detail below.

Pellet Size

In one or more embodiments, the pellets of this invention may be characterized by an average particle size, represented as an average particle diameter, of from about 125 to about 2250 microns.

Concentration of Binder

In one or more embodiments, the pellets of the present invention may be characterized based upon the binder content of the pellet. In one or more embodiments, the pellets include from about 1 to about 35, in other embodiments from about 2.5 to about 30, and in other embodiments from about 5 to about 25 weight percent binder based upon the total weight of the pellet, with the balance being carbon black. In one or more embodiments, the relative concentrations of binder and carbon black are tailored to maintain the pellets as a free-flowing material.

Carbon Black Type

The carbon blacks of the present invention can include but are not limited to the commonly available, commercially produced carbon blacks used in rubber products such as N-110, N-220, N-343, N-339, N-330, N-351, N-472, N-550, N-660, N-880 and N-990 as designated by ASTM D-1765-99a, as well as various channel blacks, and conductive carbon blacks. Other carbon blacks which may be utilized include acetylene blacks. A mixture of two or more of the above blacks can be used in preparing the carbon black products of the invention.

Hot-Polymerized Styrene-Butadiene Polymer

As suggested above, the polymeric binder includes a hot-polymerized styrene-butadiene copolymer, which for purposes of this specification may be referred to as crosslinked styrene-butadiene copolymer. As used herein, and unless otherwise specifically stated, the term styrene-butadiene copolymer refers to polymer including polymeric units (i.e. mer units) deriving from the polymerization of aliphatic conjugated diene monomer and alkenyl aromatic monomers. As the skilled person will appreciate, the term crosslinked refers to that crosslinking that derives from the mode of polymerizing the monomer, which as noted above is a hot polymerization process.

Aliphatic conjugated diene monomers include those having from about 4 to about 8 carbon atoms or optionally from about 4 to about 6 carbon atoms. Examples of diene monomers include piperylene, isoprene, 2,3-dimethyl-1,3-butadiene, 1,3-butadiene, or mixtures thereof. Mixtures of two or more conjugated dienes may also be used.

Alkenyl aromatic monomers include compounds having from about 8 to about 12 total carbon atoms. Examples of alkenyl aromatic compounds include styrene, α-methyl styrene, p-tertiary butyl styrene, methyl vinyl toluene, p-vinyl toluene, divinyl benzene, and 3-ethyl styrene, or mixtures thereof. In one or more embodiments, the polymers employed in the practice of this invention are devoid of mer units deriving from functional monomer, which refers to those mer units that include a heteroatom such as oxygen or nitrogen.

In one or more embodiments, the crosslinked styrene-butadiene copolymer employed in the practice of this invention may be characterized by styrene content, which refers to the percentage of polymeric units deriving from the polymerization of styrene. In one or more embodiments, the styrene-butadiene copolymer used in the present invention includes from about 5 to about 60, in other embodiments from about 10 to about 50, and in other embodiments from about 17 to about 40 weight percent mer units deriving from the polymerization of styrene.

In one or more embodiments, the crosslinked styrene-butadiene copolymer employed in the practice of this invention may be characterized based upon its glass transition temperature. For example, in one or more embodiments, the styrene-butadiene copolymer may be characterized by a glass transition temperature (Tg) of from about −50 to about 60, in other embodiments from about −45 to about 30, and in other embodiments from about −40 to about 15° C. Tg is typically determined based upon dried samples or films of the latex using DSC techniques.

In one or more embodiments, the crosslinked styrene-butadiene copolymer employed in the practice of this invention may be characterized by gel content, which refers to the weight percent of crosslinked, insoluble polymer. In one or more embodiments, the styrene-butadiene copolymer used in the present invention is characterized by a gel content of at least 20 weight percent, in other embodiments at least 50 weight percent, in other embodiments at least 70 weight percent, and in other embodiments at least 90 weight percent. In these or other embodiments, the gel content is from about 20 to about 99, in other embodiments from about 50 to about 95, and in other embodiments from about 70 to about 90 weight percent. Gel content is typically determined based on insoluble fractions within a solvent such as THF or toluene.

In one or more embodiments, the crosslinked styrene-butadiene polymer employed in the present invention may be highly branched.

Useful crosslinked styrene-butadiene can be commercially obtained. Exemplary polymers that are commercially available include those functional polymers available under the tradenames GENFLO 2002 (OMNOVA Solutions, Inc).

Process for Making Styrene-Butadiene Copolymer

In one or more embodiments, the styrene-butadiene polymer employed in the practice of this invention may be synthesized by using known techniques for making polymers of this nature. For example, crosslinked styrene-butadiene copolymer may be synthesized by using known emulsion polymerization techniques including hot emulsion techniques wherein the polymerization is conducted at temperatures above 35, in other embodiments above 40, and in other embodiments above 45° C.

Process for Making Pellets

In one or more embodiments, the pellets of the present invention can be prepared by introducing carbon black to a latex containing the styrene-butadiene copolymer to thereby form a mixture of carbon black and styrene-butadiene copolymer. In one or more embodiments, the carbon black and styrene-butadiene copolymer are at least partially suspended or dispersed within water. In one or more embodiments, the carbon black may be introduced to the latex as a slurry, wherein the carbon black is at least partially suspended or dispersed in water. The mixture can then be further processed using conventional techniques for densifying the solids within the aqueous mixture. For example, processes for densification of carbon black mixtures is disclosed in U.S. Pat. Nos. 2,283,364, 2,457,962, and 5,654,357, which are incorporated herein by reference.

An exemplary process for forming carbon black pellets according to the present invention can be described with reference to FIG. 1, where process 10 includes introducing carbon black 12 and water 14 for form slurry 16. The respective streams (12, 14) are mixed within, for example, a mixhead to produce slurry 16. Water mist 18 may optionally be further applied to the slurry. A binder composition 20, which includes styrene-butadiene copolymer, may be introduced to slurry 16 to form a mixture 22. Mixture 22 may be further processed by further agitation and/or mixing. The mixture may then be pelletized at step 24 by using conventional techniques. For example, the pellets of the present invention can be formed by compaction techniques that can employ conventional continuous pin mixers or drum driers.

Following densification, the pellets may be dried and, optionally, finished, at drier 26. The pellets may be dried by exposure to heat, microwave radiation, or infrared radiation. The drying step may include an oven or hot air source that heats the pellets and there through transfers heat to the pellets.

The process of producing a pellet containing a filler and a binder may optionally include other sub-processes. These can include the production, or processing, of the filler material (e.g. collection, isolation, purification), the preparation of the filler for the application to the binder (e.g. pellet formation (separate from the final pellet formation), pressing into flakes, extrusion into rods or cylinders (separate from the final extrusion)), the application of the binder, reacting components, and packaging the final pellets (or other final product).

Practice of the present invention is not limited by the type of emulsion, suspension, or latex so long as the emulsion or latex includes a styrene-butadiene copolymer as described herein. Polymeric latexes including styrene-butadiene copolymer are well known in the art and commercially available In one or more embodiments, the polymer latex employed to prepare the carbon black pellets of the present invention can be characterized based upon the weight percent solids in the latex. In one or more embodiments, the polymer latex may include from about 0.5 to about 50, in other embodiments from about 5 to about 35, and in other embodiments from about 15 to about 25 weight percent solids.

The polymer latex employed to prepare the pellets of the present invention may also be characterized based upon the viscosity of the latex. In one or more embodiments, the latex may have a viscosity of from about 25 to about 2500, in other embodiments from about 50 to about 1800, and in other embodiments from about 100 to about 900 cps.

INDUSTRIAL APPLICABILITY

In one or more embodiments, the pellets of the present invention can be used in the preparation of tire components. For example, these tire components may include treads, sidewalls, innerliners, bead fillers, abrasion strips, and cord plies.

Practice of the present invention does not alter the methods or techniques for preparing tires or tire components. Generally speaking, the carbon black pellets of the present invention can be mixed with one or more rubbers and vulcanizing agents to prepare a vulcanizable composition of matter. These vulcanizable compositions of matter can then be fabricated into green tire components, and a green tire can be constructed using these green tire components. After construction of the green tire, conventional vulcanization techniques can be employed to form a cured tire. Conventional techniques for preparing tires are well known in the art as described in U.S. Publ. No. 2012/0053264, which is incorporated herein by reference. These vulcanizable compositions of matter can also be employed in cured or uncured treads used in retreading tires. The retreading of tires is generally well known as described in U.S. Pat. Nos. 7,052,568, 8,025,750 8,603,274, which are incorporated herein by reference.

Various modifications and alterations that do not depart from the scope and spirit of this invention will become apparent to those skilled in the art. This invention is not to be duly limited to the illustrative embodiments set forth herein.

What is claimed is:

1. A carbon black pellet comprising:
   i. a plurality of carbon black agglomerates, carbon black aggregates, or primary carbon black particles; and
   ii. a binder including a hot-polymerized styrene-butadiene copolymer, where the binder and the carbon black agglomerates, carbon black aggregates, or primary carbon black particles form a carbon black pellet, where the carbon black pellet has an average particle size of from about 125 to about 2250 microns.

2. The pellet of claim 1, where the binder forms a matrix in which the carbon black agglomerates, carbon black aggregates, or primary carbon black particles are dispersed.

3. The pellet of claim 1, where the carbon black pellet includes from about 1 to about 35 weight percent of the binder, and about 65 to about 99 weight percent of the plurality of carbon black agglomerates, carbon black aggregates, or primary carbon black particles, based upon the entire weight of the carbon black pellet.

4. The pellet of claim 1, where the hot-polymerized styrene-butadiene copolymer is emulsion polymerized at temperatures above 40° C.

5. The pellet of claim 1, where the hot-polymerized styrene-butadiene copolymer has a Tg of from −50 to 60° C.

6. The pellet of claim 1, where the hot-polymerized styrene-butadiene copolymer includes from about 5 to about 60 weight percent mer units deriving from styrene.

7. The pellet of claim 1, where the hot-polymerized styrene-butadiene copolymer has a gel content of at least 20 weight percent.

8. A process for making a carbon black pellet, the process comprising:
   i. introducing carbon black to a latex containing a hot-polymerized crosslinked styrene-butadiene copolymer to form a mixture; and
   ii. densifying the mixture to form a carbon black pellet, where the carbon black pellet has an average particle size of from about 125 to about 2250 microns.

9. The process of claim 8, where the carbon black is introduced to the latex as a slurry.

10. The process of claim 8, where the carbon black pellet includes from about 1 to about 35 weight percent of the hot-polymerized crosslinked styrene-butadiene copolymer, and about 65 to about 99 weight percent of the carbon black, based upon the entire weight of the carbon black pellet.

11. The process of claim 8, where the hot-polymerized crosslinked styrene-butadiene copolymer has a gel content of at least 20 weight percent.

12. The process of claim 8, where the hot-polymerized crosslinked styrene-butadiene copolymer has a Tg of from −50 to 60° C.

13. The process of claim 8, further comprising steps of drying the carbon black pellet to form a final carbon black pellet; and
packaging the final carbon black pellet.

14. A carbon black pellet comprising:
i. a plurality of carbon black agglomerates, carbon black aggregates, or primary carbon black particles; and
ii. a binder including a hot-polymerized styrene-butadiene copolymer, wherein the styrene-butadiene copolymer has a gel content of at least 20 weight percent, where the binder and carbon black agglomerates, carbon black aggregates, or primary carbon black particles form a carbon black pellet, wherein the carbon black pellet has an average particle size of from about 125 to about 2250 microns.

* * * * *